(12) United States Patent
Purdy et al.

(10) Patent No.: US 10,753,001 B2
(45) Date of Patent: Aug. 25, 2020

(54) SYNTHETIC HYDROXIDE COMPOSITIONS AND USES THEREOF

(71) Applicant: FLUID ENERGY GROUP LTD., Calgary, Alberta (CA)

(72) Inventors: Clay Purdy, Medicine Hat (CA); Darren Thatcher, High River (CA); Alexander David Jamieson, Calgary (CA)

(73) Assignee: Fluid Energy Group Ltd., Calgary, Alberta (CA)

( * ) Notice: Subject to any disclaimer, the term of this patent is extended or adjusted under 35 U.S.C. 154(b) by 0 days.

(21) Appl. No.: 15/779,934

(22) PCT Filed: Dec. 7, 2016

(86) PCT No.: PCT/CA2016/000306
§ 371 (c)(1),
(2) Date: May 30, 2018

(87) PCT Pub. No.: WO2017/096459
PCT Pub. Date: Jun. 15, 2017

(65) Prior Publication Data
US 2018/0355491 A1     Dec. 13, 2018

(30) Foreign Application Priority Data

Dec. 7, 2015  (CA) .................................... 2914073

(51) Int. Cl.
*C23F 11/06* (2006.01)
*C09K 8/52* (2006.01)
*C09K 8/72* (2006.01)
*C10G 19/04* (2006.01)
*C10G 75/04* (2006.01)
*C09K 8/36* (2006.01)
*C09K 8/06* (2006.01)
*C10G 75/02* (2006.01)

(52) U.S. Cl.
CPC ................ *C23F 11/06* (2013.01); *C09K 8/06* (2013.01); *C09K 8/36* (2013.01); *C09K 8/52* (2013.01); *C09K 8/72* (2013.01); *C10G 19/04* (2013.01); *C10G 75/02* (2013.01); *C10G 75/04* (2013.01); *C09K 2208/20* (2013.01); *C09K 2208/22* (2013.01); *C10G 2300/1033* (2013.01)

(58) Field of Classification Search
None
See application file for complete search history.

(56) References Cited

U.S. PATENT DOCUMENTS

2014/0303049 A1* 10/2014 Holdsworth ............. C09K 8/56
507/241

FOREIGN PATENT DOCUMENTS

| CA | 2852729 A1 | 11/2015 |
| WO | 2005111187 A1 | 11/2005 |
| WO | 2013181150 A1 | 12/2013 |
| WO | 2015179948 A1 | 12/2015 |

OTHER PUBLICATIONS

PCT Int'l Search Report issued in co-pending PCT Application No. PCT/CA2016/000306, dated Feb. 8, 2017, 2 pages.

* cited by examiner

*Primary Examiner* — John J Figueroa
(74) *Attorney, Agent, or Firm* — Blank Rome, LLP

(57) ABSTRACT

A synthetic caustic composition for use in oil & gas industry activities, said composition comprising: metal hydroxides; an amino acid; urea; a sodium silicate and water.

20 Claims, No Drawings

SYNTHETIC HYDROXIDE COMPOSITIONS AND USES THEREOF

CROSS REFERENCE TO RELATED APPLICATIONS

This application is a national stage of International Patent Application No. PCT/CA2016/000306, filed Dec. 7, 2016 which claims the benefit of Canadian Patent Application No. 2,914,073, filed Dec. 7, 2015, the contents of which are hereby incorporated by reference in their entirety.

FIELD OF THE INVENTION

This invention relates to compositions for use in performing various operations in the oil & gas industry, more specifically to synthetic hydroxide compositions as alternatives to conventional various bases or hydroxides.

BACKGROUND OF THE INVENTION

The present invention applies to the pH control of fluid systems utilized in various industrial applications including in the oil & gas industry. One of the typical uses for caustics is for scale removal and scale control, these are also uses targeted by the present invention.

In the oil & gas industry, hydroxides are mainly used in fluid systems to increase or maintain pH and alkalinity or neutralize acidic fluids, although there are many other applications for the invention. Some can be highly hazardous materials to handle because they are very hygroscopic and typically have a high exothermic reaction with other fluids, especially acids. Sodium hydroxide (NaOH) is soluble in water, ethanol and methanol. These solutions can cause severe, irreversible dermal/ocular burns and create noxious fumes that can cause serious damage to the respiratory system. NaOH may cause chemical conjunctivitis and corneal damage. Severe eye burns with clouding of the surface, and ensuing blindness may occur from exposure to liquid sodium hydroxide. Low concentration levels of mists or aerosols cause burning discomfort, spasmodic blinking or involuntary closing of the eyelids, redness, and tearing. At room temperature sodium hydroxide is a white crystalline, odorless (in solid form) deliquescent solid, which absorbs moisture from the air. When sodium hydroxide is dissolved in water, often a mist is formed. In a liquid form (50%) NaOH has a vapor pressure of 1.5 mmHg @ 68° F. (0.20 kPa @ 20° C.) Sodium hydroxide itself is nonflammable, but in contact with moisture it may ignite combustibles. Toxic fumes may be formed upon heating. The solid, solutions, mists, and aerosols are all corrosive.

Sodium hydroxide (widely utilized) is available commercially in a solid (sodium hydroxide is most commonly sold as flakes, prills, and cast blocks) or a liquid solution (normally a 50% strength). Typically in an oil & gas drilling application a solid bead or flake is added to a mixing barrel with water until solubilized and then added to the mud system or fluid system to increase the pH for various reasons, such as to limit the precipitation of calcium and magnesium from a hard water source, limit the incompatibility of the fluid system with formation clays/shales and reduce swelling effects. Another advantage of a sodium hydroxide is the liberation of hydrogen sulfide and carbon dioxide gases from the fluid system. Having an alternative product that is non-hazardous and environmentally responsible is advantageous due to the high level of human exposure in most applications, and the fact that drill cuttings (that have residuals of the mud system) are often spread over agricultural fields as a disposal technique.

A 50% sodium hydroxide solution is widely utilized in the bitumen extraction process with relation to oil-sands development. Most commercial mineable oil sands producers use an extraction method "Clarks Hot Water Extraction" Process developed in the 1920s. One of the major operational disadvantages of a 50% NaOH solution is that it begins to freeze at 13 degrees Celsius. It is therefore advantageous to have a product with a much lower freeze point, as low as minus −20 Celsius. As the waste fluids are intentional or unintentionally released into the environment post treatment, having a product that is environmentally responsible, non-toxic and non-hazardous to handle is highly advantageous. Volumes in excess of 200,000 gallons/day are utilized in the Canadian Oil Sands, and the environmental advantages for a product with these constituents are substantial.

Alkaline Surfactant Polymer (ASP) flood applications utilize a high pH fluid to aid in reservoir recovery. Having a product that is non-hazardous is an advantage. ASP formulation typically consists of about 0.5-1% alkali, 0.1% surfactant and 0.1% polymer. The alkaline component reacts with the acidic moieties that exist in the oil creating natural soap and also helps reduce the adsorption of the surfactant on the rock.

Borate crosslinked gel fracturing fluids utilize borate ions to crosslink the hydrated polymers and provide increased viscosity. The polymers most often used in these fluids are guar and HPG. The crosslink obtained by using borate is reversible and is triggered by altering the pH of the fluid system (increasing the pH generates the crosslink function, decreasing the pH eliminates the crosslink). The reversible characteristic of the crosslink in borate fluids helps them clean up more effectively, resulting in good regained permeability and conductivity. The invention can be utilized in this situation; having a minimal negative effect on polymer chains which is another advantage of the invention. Borate crosslinked fluids have proved to be highly effective in both low and high permeability formations.

Some of the major challenges faced in the oil & gas industry with respect to the use of conventional hydroxides include the following: high levels of corrosion on certain metals which are typically countered by the use of High Density Polyurethane (HDPE) components, intensive and expensive maintenance schedules—environment and equipment; reactions between hydroxides and various types of metals can vary greatly but with certain metals, such as aluminum, effects are substantial causing immediate damage. As caustics are utilized to control pH levels in many systems throughout the life cycle of a well, exposure to these metals can happen often resulting in substantial replacement costs. This renders typical hydroxide blends as controlled in most jurisdictions and require extensive labeling/handling and transportation procedures which can add to the end users costs. Additionally, the high toxicity levels of hydroxides render them banned in many offshore operations due to concerns over unintentional release into sensitive ocean ecosystems.

Like other highly corrosive alkalis, sodium hydroxide solutions can decompose proteins and lipids in skin, eyes or other living tissues via amide hydrolysis and ester hydrolysis, which consequently causes chemical burns and may induce permanent blindness if it contacts eye tissue. Solid alkali may also express its corrosive nature if there is water present on the skin or in the eyes. Sodium hydroxide is corrosive to several metals, like aluminum which reacts with the alkali to produce flammable hydrogen gas on contact.

Having an alternative that is much less corrosive to metals and human tissue is advantageous.

The inherent environmental effects (organic sterility, poisoning of wildlife etc.) of caustics in the event of an unintended/accidental release on surface or downhole into water aquifers or sources of water are devastating which can cause significant pH increase of such and can substantially increase the toxicity and could potentially cause a mass culling of aquatic species and potential poisoning of humans/livestock and wildlife exposed to/or drinking the water. An unintended release at surface can also cause damaging fumes to be released, potentially endangering human and animal health. This is a common event at large storage sites when tanks split or leak. Typically if near the public, large areas need to be evacuated post event.

The inability for many caustics and blends of such to biodegrade naturally without irreversibly damaging the soil, results in expensive cleanup-reclamation costs for the operator should an unintended release occur. Moreover, the fumes produced by many bases are harmful to humans/animals and are highly corrosive and/or explosive potentially, transportation and storage requirements for liquid bases are restrictive and taxing in such that you must typically haul the products in tankers or intermediate bulk containers (IBC) that are rated to handle such corrosive-regulated products, creating exposure dangers for personnel having to handle them. Sodium hydroxide and its solutions, mists, and aerosols are rapidly damaging when they come in contact with the eyes, skin, and upper respiratory tract causing irritation, burns, coughing, chest pain and dyspnea. Swelling of the throat and accumulation of fluid in the lungs (shortness of breath, cyanosis, and expectoration) may occur. Ingestion of sodium hydroxide can cause severe corrosive injury to the lips, mouth, throat, esophagus, and stomach. There is no antidote to be administered to counteract the effects of sodium hydroxide. Treatment consists of supportive measures.

Price fluctuations with typical commodity caustics based on industrial output causing end users an inability to establish long term costs in their respective budgets; severe reaction with dermal/eye tissue; major PPE requirements (personal protective equipment) for handling, such as on site shower units; extremely high corrosion rates are some of the negatives to the industry standard bases utilized, such as sodium hydroxide (NaOH).

When used to control the pH levels on surface of water/fluid systems, caustics are exposed to humans and mechanical devices as well as expensive pumping equipment causing increased risk for the operator and corrosion effects that damage equipment and create hazardous hydrogen gas when they come into contact with water or aluminum. When mixed with acidic or lower pH fluids, caustics will create a large amount of thermal energy (exothermic reaction) causing potential safety concerns and equipment damage, caustics typically need to be blended with fresh water to the desired concentration requiring companies to sometimes pre-blend off-site as opposed to blending on-site, greatly thereby increasing costs associated with transportation.

Typical caustics used in a pH control situation can or will cause degradation of certain polymers/additives/systems/formations requiring further chemicals to be added to counter these potentially negative effects, many offshore areas of operations have very strict regulatory rules regarding the transportation/handling and deployment of caustics causing greatly increased liability and costs for the operator. Caustics or high pH fluids, such as caustic water can be destructive to many typical elastomers found in the oil & gas industry such as blow out preventers (BOP's)/downhole tools/packers/submersible pumps/seals, surface pumps and tank equipment etc., having to deal with high pH fluids during the back flush/disposal process is also very expensive. It is advantageous to have a high pH fluid that can be exported to production facilities through pipelines that once utilized, is typically non-hazardous greatly reducing disposal costs/fees.

Caustics perform many actions in the oil & gas industry and are considered necessary to achieve the desired production of various petroleum wells, maintain their respective systems and aid in certain functions (i.e. suppressing calcium & magnesium in hard waters). The associated dangers that come with using caustics are expansive and tasking to mitigate through controls whether they are chemically or mechanically engineered.

Eliminating or even simply reducing the negative effects of caustics while maintaining their performance level is a struggle for the industry. As the public demand for the use of cleaner/safer/greener products increases, companies are looking for alternatives that perform the required function without all or most of the drawbacks associated with the use of caustics.

U.S. Pat. No. 7,073,519 discloses a facility parts cleaning composition for the processing of (meth)acrylic acid and/or (meth)acrylic esters comprising an alkali metal hydroxide solution, a water-soluble amino acid, N,N'-methylene bisacrylamide, and azobisisobutyronitrile, and a cleaning method using the cleaning solution composition. Disclosed are compositions including 5 to 50 wt % of at least one alkali metal hydroxide selected from the group consisting of sodium hydroxide and potassium hydroxide, 0.01 to 1 wt % of a water-soluble amino acid, 0.001 to 0.05 wt % of N,N'-methylene bisacrylamide, and 0.001 to 0.05 wt % of azobisisobutyronitrile.

U.S. Pat. No. 7,902,137 discloses alkaline concentrated detergent composition for use in cleaning hard surfaces, medical instruments and other metal components (parts, tools, utensils, vessels, equipment). The description states that an important aspect of the invention is the utilization of a synergistic system of chlelants and scale inhibition components that are biodegradable. Chelation and scale inhibition are said to have a positive impact on cleaning performance of the compositions.

US Statutory Invention Registration no. H468 entitled "Alkaline hard-surface cleaners containing alkyl glycosides" discloses a cleaning composition comprising: (a) about 0.1 to 50 weight percent alkali metal hydroxide or ammonium hydroxide; (b) about 0.1 to 40 weight percent alkyl glycoside; and (c) about 10 to 95 weight percent water.

U.S. Pat. No. 6,387,864 discloses a laundry detergent composition comprising about 1 to about 75 parts by weight of at least one caustic compound, about 0.5 to about 50 parts by weight of at least one nonionic surfactant, about 1 to about 35 parts by weight of at least one primary amine compound.

U.S. Pat. No. 5,804,541 discloses a floor stripper composition is provided, having a pH-value above 9.0, and comprising a soap, water and a glycine-N,N-diacetic acid compound, which is preferably methylglycine diacetic acid (MGDA). The diacetic acid is desirably in the form of a divalent metal complex thereof. The description states that a good floor stripper performance could be obtained with this composition owing to its low foaming behaviour.

Since several operations in the oil industry expose fluids and equipment to very high temperatures (some upward of 200° C.), the caustic compositions used in these various operations need to withstand these high temperatures without losing their effectiveness. These compositions must be capable of being used in operations over a wide range of temperatures while not affecting the equipment or people it comes in contact with.

Consequently, there is still a need for compositions for use in the oil industry which can be used over a range of applications which can decrease a number of the associated dangers/issues typically associated with caustic applications to the extent that these caustic compositions are considered much safer for handling on worksites.

SUMMARY OF THE INVENTION

Compositions according to the present invention have been developed for the oil & gas industry and its associated applications, by specifically targeting the problems of corrosion, logistics, human/environmental exposure, freeze points and formation/fluid compatibilities and biodegradability.

It is an object of the present invention to provide a synthetic caustic composition which can be used over a broad range of applications in the oil and gas industry and which exhibit advantageous properties over known compositions.

According to one aspect of the present invention, there is provided a synthetic caustic composition which, upon proper use, results in a very low corrosion rate of oil and gas industry activities equipment and down-hole metals commonly utilized.

According to another aspect of the present invention, there is provided a synthetic caustic composition for use in the oil industry which is readily biodegradable.

According to another aspect of the present invention, there is provided a synthetic caustic composition for use in the oil industry which has a very non-reactive nature with skin, equipment and formation that is consistent as temperature increases, reduces or eliminates fuming, non-toxic, with a high quality-consistent controlled manufacturing process.

According to another aspect of the present invention, there is provided a synthetic caustic composition for use in the oil industry which has a pH at or above 12.

According to another aspect of the present invention, there is provided a synthetic caustic composition for use in the oil industry which is stable and does not lose its unique properties at temperatures up to 300° F.

According to another aspect of the present invention, there is provided a synthetic caustic composition for use in the oil industry which has minimal exothermic reactivity, even when blended with acids.

According to another aspect of the present invention, there is provided a synthetic caustic composition for use in the oil industry which is compatible with most existing industry additives or polymers.

According to another aspect of the present invention, there is provided a synthetic liquid caustic composition for use in the oil industry which has a very low freeze point. Minimizing or eliminating the need for large amounts of energy to heat liquid caustic while in transit or stored in bulk.

According to another aspect of the present invention, there is provided a synthetic caustic composition for use in the oil industry which results in $H_2S/CO_2$ liberation in drilling fluids. As well as a key component in the Clark's Hot Water Extraction (CHWE) Process. Developed by Dr. K. A. Clark and his coworkers at the Alberta Research Council in 1930s This process made bitumen production commercially feasible and uses Sodium Hydroxide (NaOH) as an extraction process aid to raise the pH in fluids which increases solubility of asphaltic acids which act as surfactants, promoting bitumen recovery efficiency. Having an alternative that is non-toxic and non-hazardous to handle is advantageous.

Accordingly, the product would overcome many of the drawbacks found in the use of compositions of the prior art related to the oil & gas industry.

It is an objective of the invention to provide a synthetic caustic replacement system or composition to raise the pH of certain fluid systems, suppress calcium & magnesium in hard waters, liberate $H_2S$ and $CO_2$, reduce corrosion in plants and pipelines, assist in bitumen extraction, crosslink borate fracturing systems, enhance polymer hydration, be utilized as a degreaser/cleaner, and as a neutralizing agent for acidic fluids.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the invention, there is provided a synthetic caustic composition comprising: a metal hydroxide selected from the group consisting of: sodium hydroxide; and/or potassium hydroxide; urea; an amino acid selected from the group consisting of: glycine, alanine, and/or valine; sodium silicate; and water.

Example 1—Process to Prepare a Composition According to a Preferred Embodiment of the Invention Start with a sodium hydroxide solution and add water slowly. Circulate until temperature of solution begins to decrease, then begin to add glycine and continue to circulate to ensure a completely consistent composition. Add potassium hydroxide and maintain circulation until all products have been solubilized and temperature has dissipated somewhat. Add Urea solution and Sodium Silicate until all products are solubilized and temperature has stabilized.

TABLE 1

Composition of a Preferred Embodiment of the Present Invention

| Chemical | % Wt Composition | CAS# |
| --- | --- | --- |
| Water | 43% | 7732-18-5 |
| Sodium Hydroxide | 15% | 1310-73-2 |
| Potassium Hydroxide | 17% | 1310-58-3 |
| Glycine | 7.5% | 56-40-6 |
| Sodium Silicate | 15% | 1344-09-8 |
| Urea | 2.5% | 57-13-6 |

The resulting composition of Example 1 is a clear, odourless liquid having a shelf-life of greater than 1 year. It has a freezing point temperature of approximately minus 20° C. and a boiling point temperature of approximately 100° C. It has a specific gravity of 1.24±0.02. It is completely soluble in water and its pH is +12.5.

Metal Corrosiveness

Corrosion studies were carried out using the formulation of Example 1. The corrosion studies involved exposing steel coupons (J-55 steel grade) of density 7.86 g/cm$^3$ to the composition at a temperature of 90° C. for a period of 6 hours.

TABLE 2

Corrosion Test Results with Formulation of Example 1

| Initial Wt. (g) | Final wt. (g) | Loss wt. (g) | Surface Area (cm2) | Density g/cc | Mils/yr | mm/year | lb/ft2 |
|---|---|---|---|---|---|---|---|
| 37.5433 | 37.5395 | 0.004 | 28.922 | 7.86 | 9.608398 | 0.244 | 0.000 |

Steel coupons were also exposed to a solution of sodium hydroxide (50% concentration). The results are found in Table 3 below:

TABLE 3

Corrosion Test Results with Solution of Sodium Hydroxide

| Initial Wt. (g) | Final wt. (g) | Loss wt. (g) | Surface Area (cm2) | Density g/cc | Mils/yr | mm/year | lb/ft2 |
|---|---|---|---|---|---|---|---|
| 38.045 | 38.0333 | 0.012 | 28.922 | 7.86 | 29.58375 | 0.751 | 0.001 |

The results indicate that the composition of Example 1 displays very low metal corrosion. Comparative testing of a hydroxide composition show that a standard hydroxide composition displays a corrosion of the steel coupons three times higher than that observed with the formulation of Example 1.

The composition is classified as non-corrosive (non-irritant) according to the classifications for skin tests. (such as the Epiderm SCT) The composition is non-fuming and has no volatile organic compounds nor does it have any BTEX levels above the drinking water quality levels. BTEX refers to the chemicals benzene, toluene, ethylbenzene and xylene.

With respect to the corrosion impact of the composition on typical oilfield grade steel, it was established that it was clearly well below the acceptable corrosion limits set by industry. This is true for the compositions even when exposed to temperatures exceeding 90° C.

Long term elastomer testing on the concentrated product at 70° C. and 28,000 kPa shows little to no degredation of various elastomers, including Nitrile® 70, Viton® 75, Atlas® 80, and EPDM® 70 style sealing elements.

The compositions according to the present invention can be used directly (ready-to-use) or be diluted with water depending on their use.

Table 4 includes a non-limiting list of uses (or applications) of the compositions according to the present invention upon dilution thereof ranging from approximately 0 to 99.9% dilution, include, but are not limited to: raise the pH of certain fluid systems, suppress calcium & magnesium in hard waters, liberate $H_2S$ and $CO_2$, reduce corrosion in plants and pipelines, assist in bitumen extraction, crosslink borate fracturing systems, enhance polymer hydration, be utilized as a degreaser/cleaner, and as a neutralizing agent for acidic fluids.

TABLE 4

Uses of Formulation of the Present Invention

| Application | Dilution | Benefits |
|---|---|---|
| Alkaline Surfactant Polymer Water Floods | 0.1:100 | Compatible with most polymers and polymer blends, non-damaging, very cost effective, freeze protected. |
| Enhanced polymer hydration | 0.1:100 | Ease/safety of storage & handling, compared to conventional caustic solutions. |
| Cleaner-Degreaser | 0.5:100 | Enhanced safety, non-hazardous, reduced human exposure, environmentally responsible |
| Crosslinked Borate frac system pH control | 0.2:100 | Enhanced safety & storage, non-hazardous, reduced human exposure, environmentally responsible, polymer compatibility. |
| Water Based drilling systems pH control | 0.25:100 | Enhanced safety, non-hazardous, reduced human exposure, environmentally responsible, polymer & formation compatibility. Less potential for Clay swelling. |
| CHWP pH Control | 1:100 | Used in a variety of applications to adjust pH level of water based systems, such as bitumen extraction, freeze protected. |
| Caustic Scrubbers | 50:100 | Cost effective. Enhanced safety, non-hazardous, reduced human exposure, environmentally responsible, equipment friendly. Freeze protected. |

Table 5 illustrates the effectiveness of the formulation of Example 1 in controlling pH versus a 50% Sodium Hydroxide solution.

TABLE 5

Comparative testing of pH Control between Sodium Hydroxide and the Formulation of Example 2

| ml added | 50% NaOH | Example 1 |
|---|---|---|
| 0 | 8.62 | 8.19 |
| 0.2 | 11.47 | 9.57 |
| 0.4 | 11.79 | 9.86 |
| 0.6 | 11.96 | 10.25 |

TABLE 5-continued

Comparative testing of pH Control between Sodium Hydroxide and the Formulation of Example 2

| ml added | 50% NaOH | Example 1 |
|---|---|---|
| 0.8 | 12.13 | 10.51 |
| 1 | 12.24 | 10.77 |

Biodegradation

The formulation of Example 1 has been tested for biodegradation and has been deemed readily biodegradable. The criteria for consideration as biodegradable are that the composition achieved ≥60% degradation within 28 days and achieved ≥60% biodegradation within 10 and 14 days after achieving 10% biodegradation (10-day window and 14-day window, respectively). Table 6 lists the results of the testing:

TABLE 6

Biodegradation of the Formulation of Example 1

| Day | % degradation |
|---|---|
| 0 | 0.0 |
| 4 | 56.0 |
| 7 | 72.0 |
| 11 | 86.0 |
| 14 | 90.0 |
| 21 | 92.0 |
| 28 | 94.0 |

Based on visual assessment of the biodegradation curve, the test item achieved approximately 85% degradation 10 days after achieving 10% biodegradation (10 day window). Also based on visual assessment of the biodegradation curve, the test item achieved approximately 90% degradation 14 days after achieving 10% biodegradation (14 day window).

The invention claimed is:

1. A synthetic caustic composition for use in oil industry activities, said composition comprising:
   at least one metal hydroxide;
   an amino acid;
   urea;
   a sodium silicate; and
   water.

2. The synthetic caustic composition according to claim 1, wherein the at least one metal hydroxide is selected from the group consisting of: sodium hydroxide and/or potassium hydroxide.

3. The synthetic caustic composition according to claim 1, wherein the amino acid is selected from the group consisting of: glycine, alanine and valine.

4. The synthetic caustic composition according to claim 1, wherein the at least one metal hydroxide is present in an amount ranging from 20% to 50% by weight of the total weight of the composition.

5. The synthetic caustic composition according to claim 4, wherein the at least one metal hydroxide is present in an amount ranging from 30% to 40% by weight of the total weight of the composition.

6. The synthetic caustic composition according to claim 1, wherein the amino acid is present in an amount ranging from 5% to 25% by weight of the total weight of the composition.

7. The synthetic caustic composition according to claim 6, where the amino acid is present in an amount ranging from 10% to 15% by weight of the total weight of the composition.

8. The synthetic caustic composition according to claim 1, where the sodium silicate is present in an amount ranging from 1% to 20% by weight of the total weight of the composition.

9. The synthetic caustic composition according to claim 8, where the sodium silicate is present in an amount ranging from 1% to 5% by weight of the total weight of the composition.

10. The synthetic caustic composition according to claim 1, wherein the synthetic caustic composition has a freeze point below −20 degrees Celsius.

11. The synthetic caustic composition according to claim 1, wherein the composition has a pH at or above 12.

12. The synthetic caustic composition according to claim 1, wherein the composition is used in any one of pH regulation of a fluid for a bitumen extraction process, pH regulation of caustic water drilling fluids, pH regulation in a cross-linked borate fracturing system, pH regulation of a mud based drilling fluids system, pH regulation in an enhanced polymer flood application, and changing the pH of an acidic fluid.

13. The synthetic caustic composition according to claim 1, wherein the composition is stable at temperatures of up to 300° F.

14. A composition for use as a cleaner or degreaser, the composition comprising the synthetic caustic composition of claim 1.

15. A composition for use in polymer hydration enhancement, the composition comprising the synthetic caustic composition of claim 1.

16. A composition the liberation of $H_2S$ or $CO_2$ in drilling fluid systems, the composition comprising the synthetic caustic composition of claim 1.

17. A composition for use as an acid gas scrubber, the composition comprising the synthetic caustic composition of claim 1.

18. A composition for the removal of sulfurous impurities from crude oil, the composition comprising the synthetic caustic composition of claim 1.

19. A composition comprising the synthetic caustic composition of claim 1, wherein at least 90% of the composition biodegrades within 14 days.

20. A synthetic caustic composition for use in scale removal and/or scale control oil industry activities, said composition comprising:
   at least one metal hydroxide;
   an amino acid;
   urea;
   a sodium silicate; and
   water.

* * * * *